July 22, 1924.
O. C. HANSON
BEET TOPPING MACHINE
Filed May 11, 1923
1,502,384
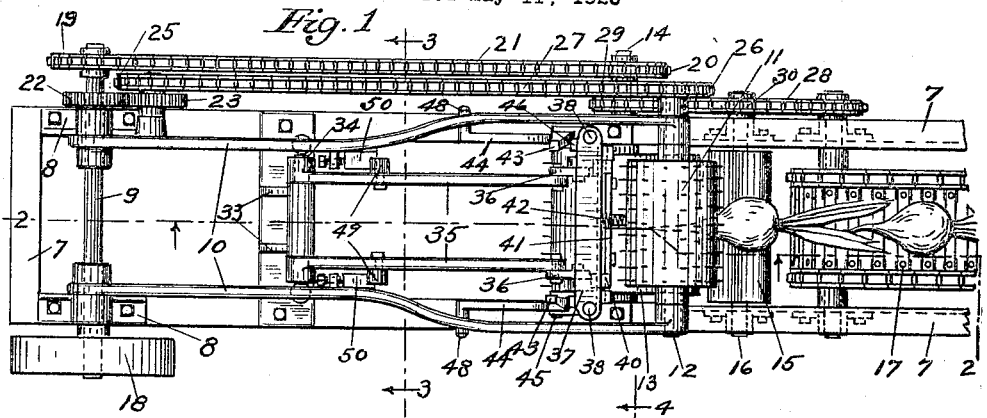
Fig. 1
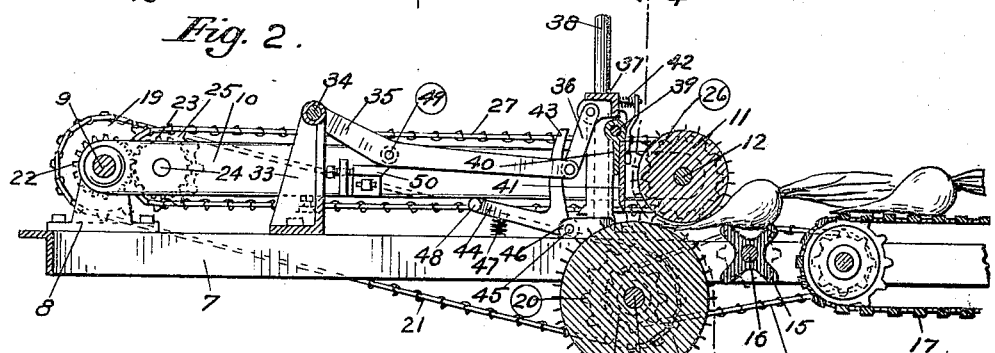
Fig. 2
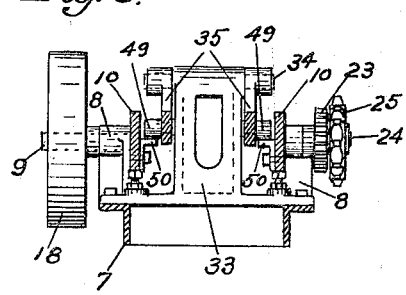
Fig. 3
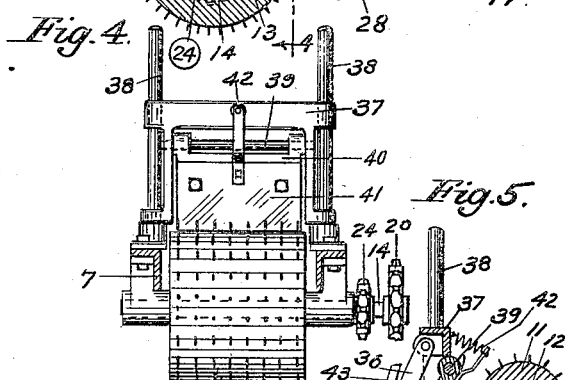
Fig. 4
Fig. 5
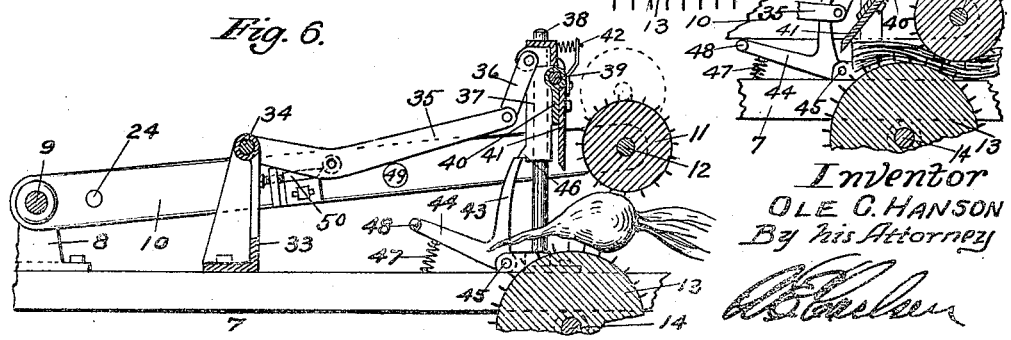
Fig. 6
Inventor
OLE C. HANSON
By his Attorney Patented July 22, 1924.

1,502,384

UNITED STATES PATENT OFFICE.

OLE C. HANSON, OF HOPKINS, MINNESOTA.

BEET-TOPPING MACHINE.

Application filed May 11, 1923. Serial No. 638,211.

*To all whom it may concern:*

Be it known that I, OLE C. HANSON, a citizen of the United States, residing at Hopkins, in the county of Hennepin and State of Minnesota, have invented certain new and useful Improvements in Beet-Topping Machines, of which the following is a specification.

This invention relates to beet topping devices and the main object is to provide a novel, efficient and practical mechanism for topping beets, or like tubers, which mechanism is herein shown as a unit, but which may be embodied and used, if so desired, in a beet harvesting machine. Further objects will be disclosed in the course of the following specification, and are illustrated in the structure shown in the accompanying drawing, in which:

Fig. 1 is a top or plan view of the machine.

Fig. 2 is a sectional elevation on the line 2—2 in Fig. 1.

Fig. 3 is a sectional elevation on the line 3—3 in Fig. 1.

Fig. 4 is a sectional elevation as seen substantially on the line 4—4 in Fig. 2.

Fig. 5 is a sectional view, similar to a part of Fig. 2, but showing some of the elements in a different position.

Fig. 6 is a sectional elevation, similar to Fig. 2, showing the cutter mechanism raised and ready to be tripped.

Reference will now be more particularly made to the figures of the drawing, by reference characters, like characters referring to like parts in the various figures.

The entire topping mechanism is mounted upon a main frame 7, which frame may either be stationary, or may form a part of a beet harvesting machine, such as is shown in my application for patent for beet harvester filed April 10th, 1922, Ser. No. 551,363.

A pair of bearing members 8 are secured at one end of the frame, and in them is journaled a shaft 9, upon which is pivotally secured the rear end of an auxiliary frame 10. A spiked roller 11 is mounted on a shaft 12 at the front end of the frame 10, and co-acts with a larger spiked roller 13, mounted on a shaft 14, journaled in the main frame 7. An irregular feeding roller 15 is fixed on a shaft 16, in the frame 7, immediately forward of the rollers 11 and 13, and a conveyor 17 is arranged to deliver untopped beets to the irregular roller 15.

The power for driving the machine is preferably applied to the shaft 9 through a pulley 18, at one end thereof. At the other end of the shaft 9 is a sprocket gear 19, which drives a gear 20 on the shaft 14 through the medium of the sprocket chain 21, and a spur gear 22 meshing with a spur gear 23, mounted on a stub shaft 24, in the frame 10. A sprocket gear 25 is also fixed on the stub shaft 24, and drives a sprocket gear 26 on the shaft 12, through a chain 27. A sprocket chain 28 passes over and operatively connects a pinion 29, on the shaft 14, a pinion 30, on the shaft 12, and a pinion 31, on the conveyor shaft 32.

A standard 33 is suitably mounted on the frame 7, and at its upper end is provided with a shaft 34, upon the ends of which is fulcrumed a tripping frame 35, the forward end of which is connected by links 36 to a plunger frame 37. The frame 37 is slidably guided and retained on a pair of fixed vertical bars 38, and is provided with a horizontal bar 39, on which is pivoted a bracket 40, having a knife 41. The knife is normally held in vertical position by a spring 42, but may be yieldingly pushed rearwardly by the beet tops, as shown in Fig. 5.

A pair of bent levers 43, 44 are pivotally secured to the main frame, as at 45. The arms 43 of the levers are adapted to engage under catches 46 of the plunger frame 37, as shown in Fig. 6, when the frame 37 is lifted by the tripping frame 35, and springs 47 are adapted to yieldingly press said lever arms 43 into such engagement. The arms 44 are provided with angular extensions 48 upon which the frame 10 may drop, and thus disengage the arms 43 from the catches 46, thus allowing the knife 41 to drop.

The tripping frame 35 is provided with a pair of studs or rollers 49, engaged by a pair of adjustable dogs 50 on the frame 10, which dogs will disengage the rollers after lifting them to a predetermined point, the disengagement resulting from the differences of the respective swinging centers and radii of the dogs and rollers.

In the use and operation of the machine the beets (or other vegetables) are fed onto the conveyor 17, tips foremost, as shown. The irregular roller 15 moves the beets rearward and feeds them from the conveyor into the rollers 11 and 13. As the beets are pulled in between the spiked rollers, the roller 11 rises and with it raises the frame 10. As the frame 10 is raised it also raises the frame 35, which, by reason of the relative lever lengths, raises the knife frame 37 up into the position shown in Fig. 6, where the bent lever arms 43 will engage under the catches 46. Immediately thereafter the dogs 50 disengage the rollers 49, leaving the plunger frame suspended on the lever arms 43, and allowing the frame 10 to be raised as high as the size of the incoming beet will necessitate. As soon as the beet passes through the rollers 13 and 11, and the latter drops down, the frame 10 will, by pulling down on the lever extensions 48, release the catches 46 from the arms 43, thus causing the knife 41 to drop down and chop the top off of the beet, which will then drop down. As the beet tops are pulled between the rollers they will push the knife 41 out of their way, against the tension of the spring 42, and will then also drop down, to be later separated from the beets and disposed of as is found most desirable.

It will be readily understood that, as each beet to be topped must pass entirely through between the rollers, the knife will cut the top only at a point very close to the top, as a fractional amount of time is required to trip the frame 35 and allow the plunger frame and the knife to drop from their uppermost position, as shown in Fig. 6.

It is also understood that suitable modifications may be made in the combination and structural details of the machine, as herein described, provided, however, that such modifications come within the spirit and scope of the appended claims. Having now therefore fully illustrated and described my invention, what I claim is:

1. The combination in a topping machine, of a main frame, an auxiliary frame pivotally mounted at one end to the main frame, a roller at the other end of the auxiliary frame, a second roller mounted in the main frame for engagement with the first mentioned roller, a knife movable to and from the second roller, means operative by the auxiliary frame for raising the knife, and means for dropping the knife upon lowering of the auxiliary frame.

2. In a topping machine, a primary roller mounted on a stationary axis, a secondary roller mounted to move to and away from the primary roller, and a cutting device movable to and away from the primary roller and actuable by the movement of the secondary roller.

3. In a topping machine, a main frame, a primary roller mounted therein, a secondary frame mounted to swing on the main frame, a secondary roller mounted in the swinging end of the secondary frame so as to co-act with the primary roller, a cutting device adapted to coact with the primary roller, and means operative by the secondary frame for actuating the cutting device.

4. In a topping machine, a pair of rollers adapted to pull beets or the like therebetween, and a movable knife adapted to top said beets as they leave the rollers, and said knife being hinged to swing in the direction of the movement of the beets.

5. In a topping machine, a pair of yieldingly separable rollers adapted to have beets passed therebetween, and a knife movable to and away from one of the rollers to top beets having passed therebetween.

6. In a topping machine, a pair of yieldingly separable rollers adapted to have beets passed therebetween, a knife adapted to top the beets delivered by the rollers, and means for mounting the knife whereby it may be yieldingly swung away from the rollers.

7. In a topping machine, a pair of yieldingly separable rollers, a frame movable to and away from one of the rollers, a knife mounted in said frame and spring means for yieldingly retaining the knife in its cutting position.

8. In a beet topping machine having a main frame, a pair of separable rollers, an auxiliary frame carrying one of said rollers at one end and being pivotally mounted at its other end to the main frame, a plunger frame having a knife adapted to top beets delivered by said rollers, means for raising the plunger frame, and means for releasing the plunger frame upon lowering of the auxiliary frame.

9. In a topping machine, a pair of separable rollers, a plunger frame reciprocally movable with respect to one of the rollers, a knife secured in said frame, means actuable by an upward movement of the other roller for raising the plunger frame, and means actuable by a lowering movement of last mentioned roller for releasing the plunger frame and allowing it to drop to its normal position.

10. In a topping machine, a main roller, a secondary roller mounted in a movable frame so as to be movable to and away from the main roller, a knife adapted to move to and away from the main roller, a device operated by said frame for raising and suspending the knife, and means for releasing the knife to allow it to drop toward the main roller.

11. In a topping machine, a pair of yieldingly separable rollers, an irregular device journaled to feed beets or the like in between said rollers, and means for topping the beets as they are delivered by said rollers, said topping means consisting of a knife and means for successively actuating it toward one of the rollers for each time a beet is delivered therefrom.

12. In a topping machine, a pair of feeding rollers, a knife adapted to top beets fed through said rollers, means for raising the knife to a predetermined position, and means for releasing the knife at a predetermined moment, depending upon the relative positions of the feeding rollers.

13. In a topping machine, a main stationary roller, a secondary roller movable with respect to the main roller, a cutting device, means for raising the cutting device into inoperative position, and means for releasing the cutting device into operative position at a predetermined moment, depending upon the proximity of the secondary roller with respect to the main roller.

14. In a topping machine, a pair of rollers movable to and from each other and adapted to pull beets or the like therebetween, and a knife reciprocally movable with respect to one of the rollers to top beets as they leave the rollers, and means to actuate the knife toward said roller, said means being actuated by the movement of the rollers toward each other.

15. In a topping machine, a stationary roller, means for feeding beets over the roller when the latter is rotated, a knife adapted to reciprocate to and away from the roller to top beets fed thereover, means for withdrawing the knife to a predetermined position away from the roller, and means for actuating the knife, at a predetermined moment, toward the roller, depending upon the position of the beet in its course over the roller.

In testimony whereof I affix my signature.

OLE C. HANSON.